US006886655B2

(12) United States Patent
Varela et al.

(10) Patent No.: US 6,886,655 B2
(45) Date of Patent: May 3, 2005

(54) VEHICLE WHEEL END ASSEMBLY WITH DOUBLE REDUCTION GEAR SET

(75) Inventors: Tomaz Dopico Varela, Gahanna, OH (US); Fabio Maineri, Milan (IT); Corrado A. Conti, Novara (IT); Steven E. Hunter, Lancaster, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 46 days.

(21) Appl. No.: 10/216,097

(22) Filed: Aug. 9, 2002

(65) Prior Publication Data

US 2004/0026157 A1 Feb. 12, 2004

(51) Int. Cl.[7] .......................... B60K 17/04; F16H 01/20
(52) U.S. Cl. ........................ 180/343; 180/356; 180/372
(58) Field of Search .............................. 180/337, 342, 180/343, 348, 356, 371, 372, 65.5

(56) References Cited

U.S. PATENT DOCUMENTS

| 2,915,920 A | * | 12/1959 | Keese et al. ................ 475/206 |
| 3,311,186 A | * | 3/1967 | Kamlukin .................... 180/291 |
| 3,434,364 A | * | 3/1969 | Keese .......................... 74/391 |
| 5,699,869 A | * | 12/1997 | Fritzinger et al. .......... 180/65.5 |
| 6,035,956 A | | 3/2000 | Maurer et al. |
| 6,193,007 B1 | * | 2/2001 | Lie ............................. 180/374 |
| 2003/0010561 A1 | * | 1/2003 | Bartel ......................... 180/292 |
| 2003/0140717 A1 | * | 7/2003 | Bennett et al. ............... 74/410 |

FOREIGN PATENT DOCUMENTS

| DE | 577 089 | 5/1933 | |
| EP | 456096 A1 | * 11/1991 | ........... B60K/17/36 |
| EP | 552446 A1 | * 7/1993 | ............ B60K/5/04 |
| EP | 0 877 672 | 8/1999 | |
| FR | 658 212 | 6/1929 | |
| FR | 697 929 | 1/1931 | |
| GB | 1 165 217 | 9/1969 | |

* cited by examiner

Primary Examiner—Paul N. Dickson
Assistant Examiner—Laura B. Rosenberg
(74) Attorney, Agent, or Firm—Carlson, Gaskey & Olds

(57) ABSTRACT

A wheel end assembly for a mass transit vehicle includes an output shaft mounted to a wheel hub for driving a vehicle wheel. The output shaft is driven by a gear assembly mounted within a gear housing and operably coupled to an input shaft. The gear assembly includes an input gear driven by the input shaft, a first reduction gear in meshing engagement with the input gear, a second reduction gear operably coupled to the first reduction gear for rotation therewith, and an output gear in meshing engagement with the second reduction gear. The first and second reduction gears are supported on a common shaft that is positioned between the input and output shafts. The input gear and first reduction gear are positioned outboard from the output gear and associated bearings. This double reduction configuration allows vehicle aisle width to be maintained while providing a deeper drop allowing the vehicle floor to be lowered to a position closer to the ground.

18 Claims, 4 Drawing Sheets

VEHICLE WHEEL END ASSEMBLY WITH DOUBLE REDUCTION GEAR SET

BACKGROUND OF THE INVENTION

This invention relates to wheel end assembly, and more particularly to a wheel end assembly with a double reduction gear set for an inverted portal axle as used in a mass transit vehicle.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time during stops and facilitates boarding for all passengers, especially for elderly and disabled passengers as well as for children.

Mass transit vehicles typically have several axles that support, drive and steer the vehicle. Many such vehicles provide a rigid axle having an input positioned off-center near one wheel end to form an inverted portal axle configuration. The input to the portal axle rotates about a longitudinal axis and is typically low to the ground to allow the vehicle floor to be as low as possible. The output to the wheels defines a lateral axis that is vertically higher than the longitudinal axis for the input.

This inverted portal axle includes a short axle shaft member that drives the wheel end near the input and a long axle shaft member that drives the opposite wheel end. The portal axle further includes a pair of gear assemblies, one gear assembly positioned at each wheel end, to raise driving input from each of the axle shafts up to the vertically higher output position at the wheels. Typically, helical gear assemblies with idler gears are used to carry higher loads for smaller gears. Typically this gear assembly includes a gear housing, an input gear driven by the respective axle shaft, an output gear for driving the wheel, and a pair of idler gears in meshing engagement with the input and output gears.

The output gear drives a wheel shaft that is enclosed within a spindle that is mounted to the gear housing. A wheel hub is mounted for rotation relative to the spindle and receives driving input from the wheel shaft. A brake spider is also mounted to the gear housing to support a brake input member.

One disadvantage with the traditional configuration is that the inverted portal axle incorporates at least three bolted joints and four bearings to support the rotating components. Assembly time and overall component cost is significant due to the large number of components and complexity of this configuration. Also, the large number of components and the fasteners needed for the bolted joints increase the overall weight in the vehicle, which can significantly affect fuel economy.

Another disadvantage with the traditional configuration is that the ability to position the vehicle floor as close as possible to the ground is limited by the traditional helical gear assembly with idler gears. As described above, the input to the inverted portal axle is below the driving axis of rotation for the wheel ends. The helical gear assembly is used to transfer driving torque from the lower input position to the higher output position, as well as providing a desired gear reduction.

Traditionally, the helical gear assembly includes a helical pinion gear (input gear) that is operatively coupled to a ring and pinion gear at the axle input and a helical driven gear (output gear) that drives the associated wheel hub. A pair of idler gears is in meshing engagement with both the helical pinion and driven gears. This configuration, utilizing two (2) idler gears, can carry higher loads because there are two (2) tooth set contacts. However, this configuration is limited to close centerline mountings because the helical pinion gear and both idler gears are on the same centerline. Further, this configuration only provides a maximum of approximately 150 mm drop between the floor and the wheel centerline.

Accordingly, it is desirable to provide a gear assembly with required gear reduction that can easily be incorporated into an axle with non-concentric input and output components. Further, it is desirable to package this improved gear reduction assembly into an inverted portal axle configuration to provide an improved low floor profile to facilitate access to the vehicle. Additionally, it is desirable to provide a simplified wheel end assembly for an inverted portal axle configuration to reduce weight, cost, and assembly time in addition to overcoming the other deficiencies in the prior art discussed above.

SUMMARY OF THE INVENTION

A wheel end assembly includes a gear housing with a gear assembly that drives an output shaft. The output shaft is attached to a wheel hub that drives a vehicle wheel. The gear assembly includes an input gear coupled to an input shaft, a reduction gear set driven by the input gear, and an output gear coupled to the output shaft. The input gear is positioned outboard from the output gear at a position between the wheel hub and the output gear.

The input gear rotates about an input axis, the output gear rotates about an output axis, and the reduction gear set rotates about an intermediate axis positioned vertically higher than the input axis and lower than the output axis. The input, output, and intermediate axes are parallel to each other.

In the preferred embodiment, the gear assembly includes the input gear driven by the input shaft about the input axis and the output gear in driving engagement with the output shaft for rotation about the output axis. The reduction gear seat includes a first reduction gear in meshing engagement with the input gear and a second reduction gear in meshing engagement with the output gear. The first and second reduction gears are mounted to a common shaft mounted within the gear housing at a position intermediate to the input and output shafts. The input gear and first reduction gear are positioned outboard of the second reduction gear and output gear.

In one disclosed embodiment, a first bearing set supports the output gear for rotation relative to the gear housing and a second bearing set supports the wheel hub for rotation relative to the gear housing. The first reduction gear and the input gear are positioned laterally between the first and second bearing sets.

The subject invention provides a simplified wheel assembly that reduces weight, assembly time and overall cost. Additionally the double reduction gear configuration provides a separation distance of approximately 180 to 230 mm between the input and output axes, which allows a mass transit vehicle floor to be lowered to a position closer to the ground. These and other features of the present invention can be best understood from the following specifications and drawings, the following of which is a brief description.

DETAILED DESCRIPTION OF A PREFERRED EMBODIMENT

Figure 1:
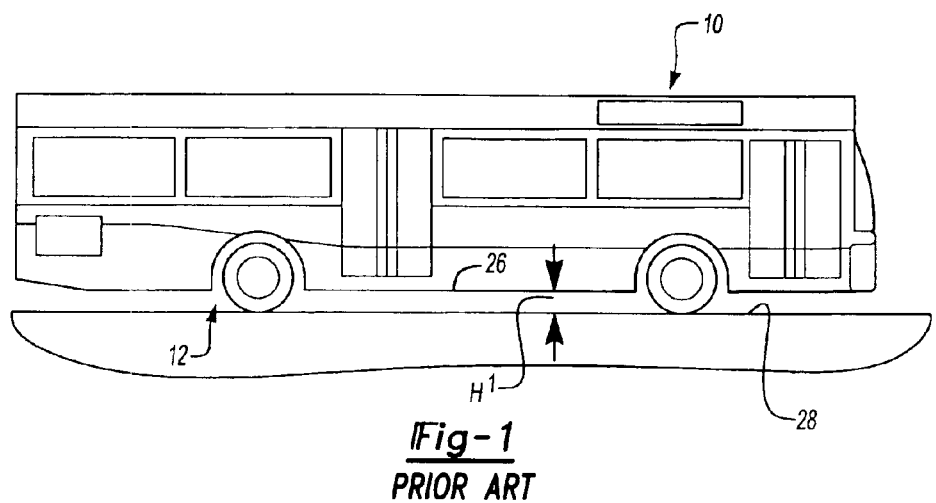
FIG. 1 is side view of a vehicle incorporating a prior art drive unit assembly.

A vehicle 10 incorporating a traditional inverted portal axle 12 is shown in FIG. 1. The inverted portal axle 12 includes a pair of wheel end assemblies 14 interconnected by an axle housing 16, shown in FIG. 2. An input 18 is positioned near one of the wheel end assemblies 14 and an axle shaft 20 connects the input 18 to the other wheel end assembly 14. A helical gear reduction assembly 22 is mounted to each wheel end assembly 14 to transfer load from the input 18 to the wheels 24.

Figure 2:
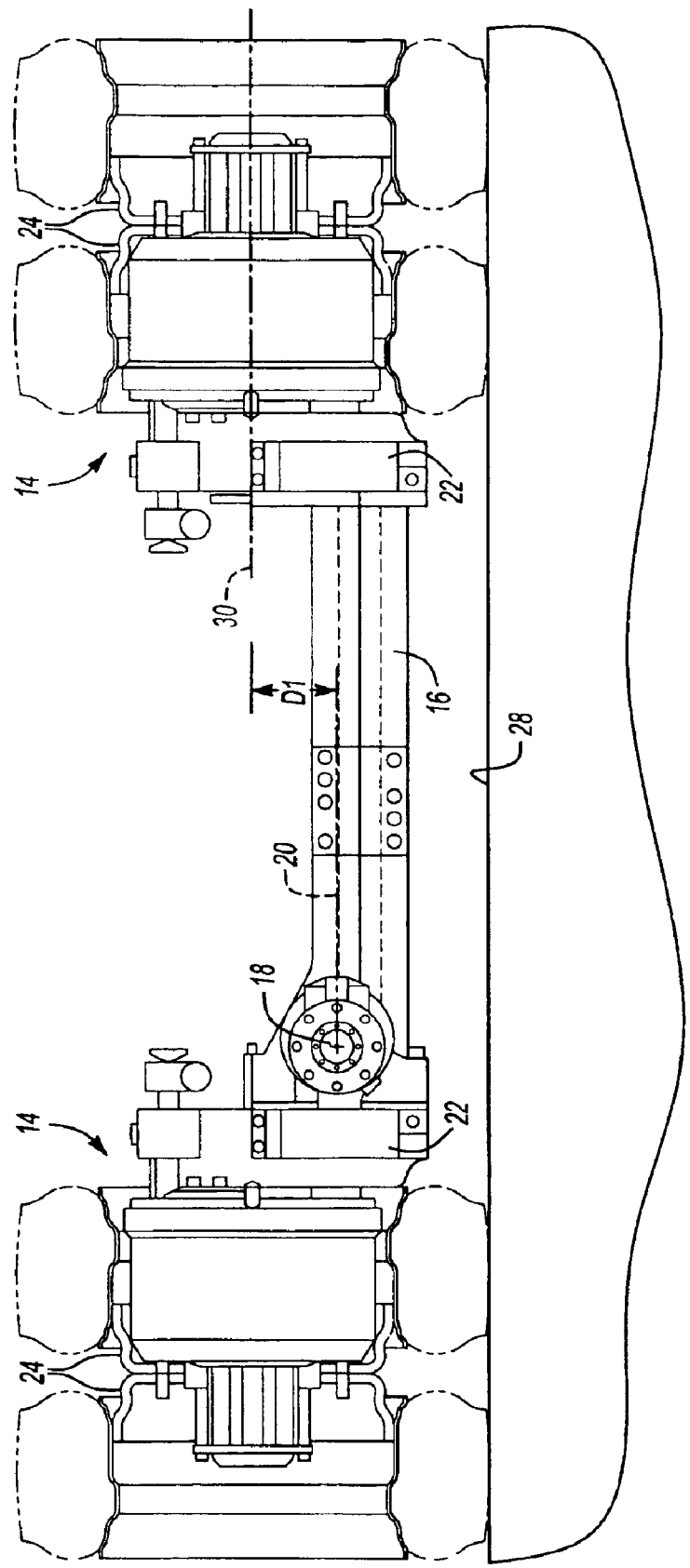
FIG. 2 is a front view of a prior art inverted portal axle.

The inverted portal axle 12 defines a floor profile having a height H1 between a vehicle floor 26 and ground 28. Currently, components such as the axle housing 16 and helical gear reduction assemblies 22 limit this height H1. As shown in FIG. 2, this height H1 is limited by a drop D1, which represents the distance between the input 18 and an output axis 30 at the vehicle wheels 24. Due to the configuration of the helical gear assembly, the drop D1 is a maximum distance of approximately 150 mm.

Figure 3:
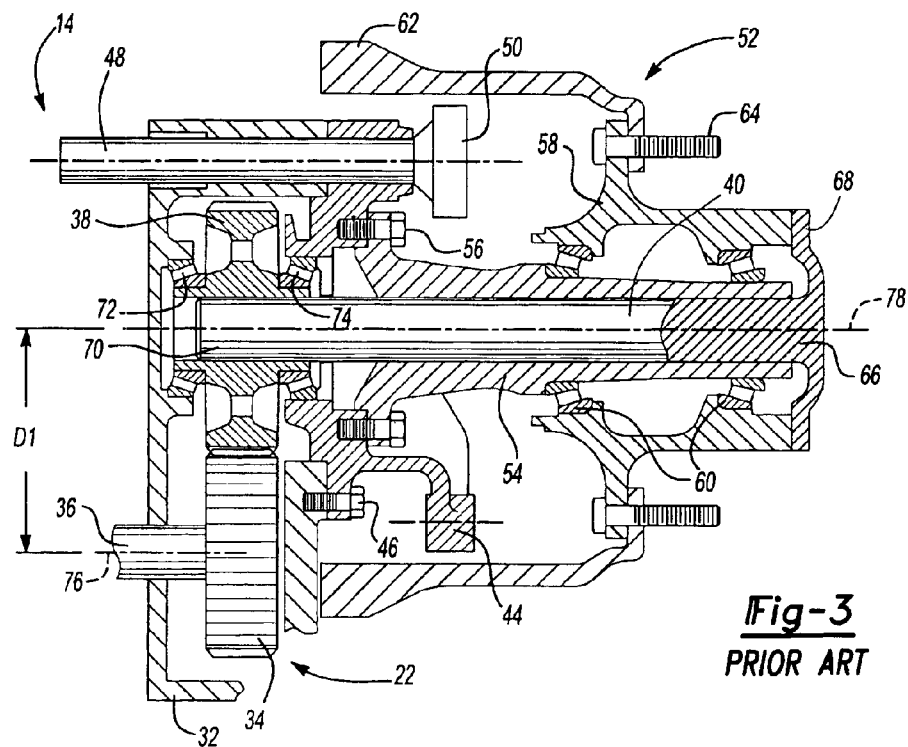
FIG. 3 is a cross-sectional view of a prior art wheel end assembly from the axle shown in FIG. 2.

A wheel end 14 with the traditional helical gear reduction assembly 22 is shown in FIG. 3. The gear reduction assembly 22 includes a gear housing 32, an input gear 34 coupled to an input shaft 36, and an output gear 38 for driving an output wheel shaft 40. The gear reduction assembly 22 also includes a pair of idler gears 42 (see FIG. 4), which react between the input gear 34 and output gear 38 to transfer driving torque from the input shaft 36 to the wheel shaft 40. The input shaft 36 receives driving input from a vehicle engine/transmission at input 18 as known.

A brake spider 44 is bolted to the gear housing 32 with a first plurality of fasteners 46. The brake spider 44 supports a camshaft 48 with a cam 50 at one end for actuating a drum brake assembly 52. It should be understood that a disc brake assembly could be mounted to the wheel end 14 in place of the drum brake assembly 52.

A spindle 54 is bolted to the brake spider 44 with a second plurality of fasteners 56. A wheel hub 58 is mounted for rotation relative to the spindle 54 on a pair of bearings 60. The drum brake assembly 52 includes a brake drum 62 that is bolted to the wheel hub 58 with a third plurality of fasteners 64.

At an outboard end 66, the wheel shaft 40 includes a flanged end 68 that is directly connected to the wheel hub 58. The output gear 38 is splined or similarly attached to the wheel shaft 40 at an inboard end 70. A first bearing 72 provides rotational support between the output gear 38 and the gear housing 32 and a second bearing 74 provides rotational support between the output gear 38 and the brake spider 44.

Figure 4:
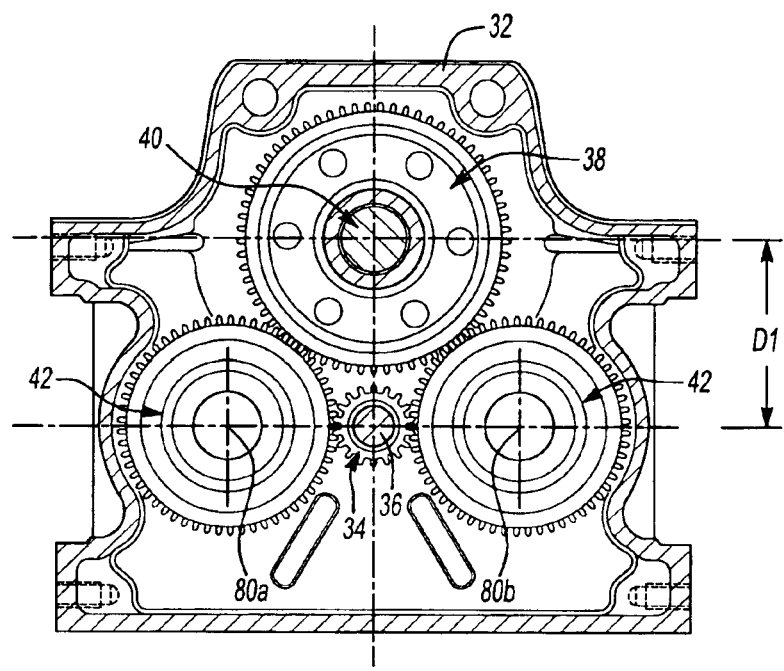
FIG. 4 is a cross-sectional view of a helical gear assembly from the wheel end assembly of FIG. 3.

The input gear 34 rotates about an input axis 76 and the output gear 38 rotates about an output axis 78 that is vertically higher than the input axis 76. As shown in FIG. 4, the idler gears 42 are non-concentric and rotate about separate idler gear axes 80a, 80b. The idler gear axes 80a, 80b are at the same vertical distance relative to the ground as the input axis 76. Also, there is no longitudinal offset between the input shaft 36 and the output wheel shaft 40. As described above, the floor profile height H1 is limited by the drop distance D1 between the input 76 and output 78 axes. Due to the helical gear configuration, this distance D1 cannot be increased beyond approximately 150 mm in a practical way.

Figure 5:
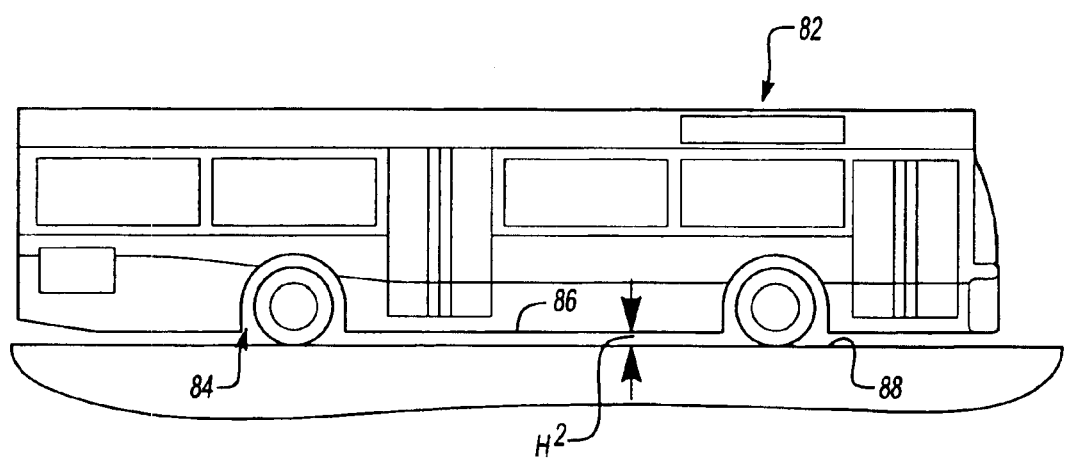
FIG. 5 is a side view of a vehicle with an inverted portal axle incorporating the subject invention.

In order to facilitate ingress and egress from vehicles such as buses, trolley cars, etc., it is preferable to position the floor profile lower to the ground. A vehicle 82 with an improved drive unit assembly 84 is shown in FIG. 5. The drive unit assembly 84 includes a unique gear reduction assembly (shown in FIGS. 6 and 7) that allows the floor profile to be lower than traditional floor profiles. The subject drive unit assembly 84 defines a floor profile having a height H2 between a vehicle floor 86 and the ground 88 that is less than H1.

Figure 6:
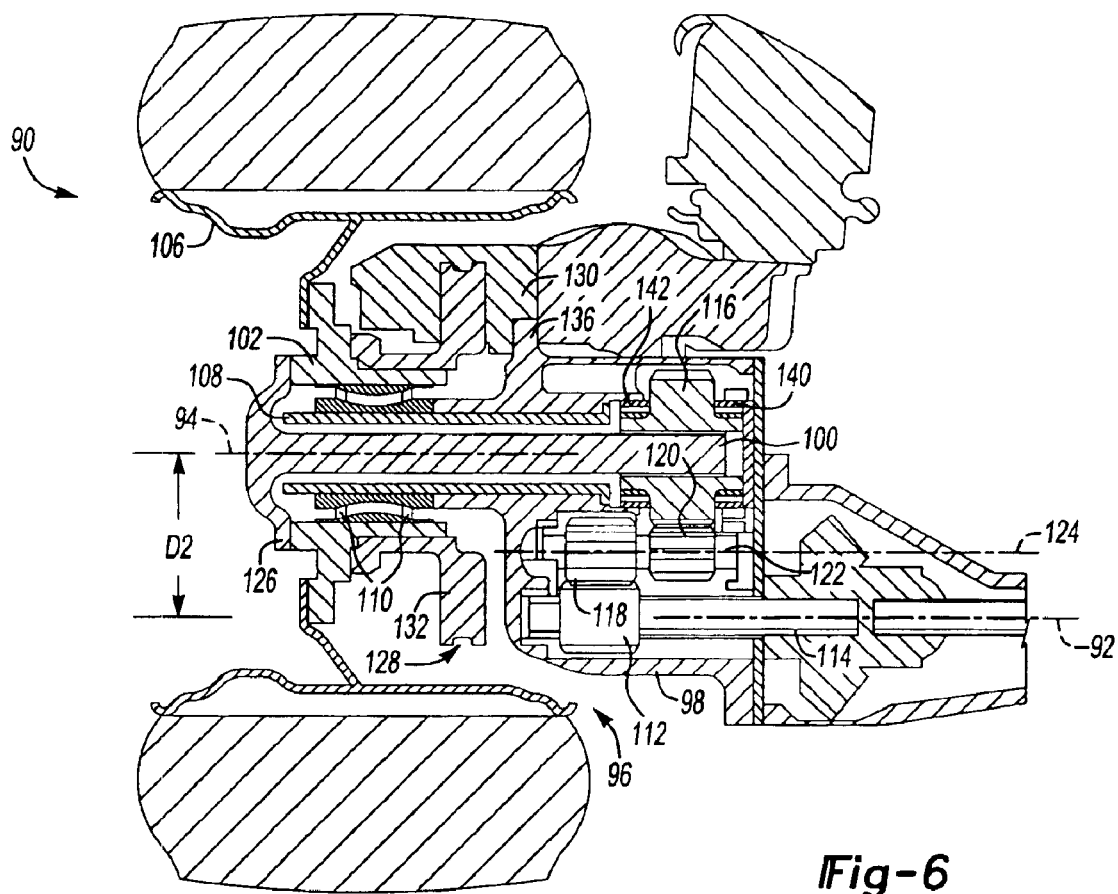
FIG. 6 is a cross-sectional view of a wheel end assembly incorporating the subject invention.

The subject invention provides a wheel end assembly 90 for the drive unit assembly 84 that increases drop distance D2 between input 92 and output 94 axes, which allows the floor profile to be significantly lowered. As shown in FIG. 6, the wheel end assembly 90 includes a gear set 96 mounted within a gear housing 98. The gear set 96 drives an output wheel shaft 100 that is operably coupled to a wheel hub 102, which supports a vehicle wheel 106 as known.

The improved wheel end assembly 90 reduces the overall number of bolted joints and components as compared to a traditional wheel end design by eliminating the spindle and associated bolted joint. The wheel end assembly 90 utilizes a tube 108 pressed into the gear housing 98 to support wheel bearings 110. This feature is described in detail in co-pending application "Vehicle Wheel End Assembly With Support Tube," which is assigned to the assignee of the present application and is herein incorporated by reference.

In this embodiment, the gear set 96 includes an input gear 112 coupled to an input shaft 114 for rotation about the input axis 92 and an output gear 116 for driving the output wheel shaft 100 about the output axis 94. The gear set 96 also includes a reduction gear set for transferring driving force from the input gear 112 to the output gear 116. The reduction gear set includes a first reduction gear 118 in meshing engagement with the input gear 112 and a second reduction gear 120 in meshing engagement with the output gear 116.

The first 118 and second 120 reduction gears are supported on a common intermediate shaft 122 positioned within the gear housing 98 between the input 114 and output 100 shafts. The first 118 and second 120 reduction gears are fixed for rotation with the intermediate shaft 122. The first reduction gear 118 is preferably splined to an outboard end of the intermediate shaft 122 and the second reduction gear 120 is preferably splined to an inboard end of the intermediate shaft 122. The first 118 and second 120 reduction gears are concentric and rotate about an intermediate axis 124 defined by the intermediate shaft 122. Further, the first reduction gear 118 and the input gear 112 are positioned outboard of the second reduction gear 120 and output gear 116.

Figure 7:
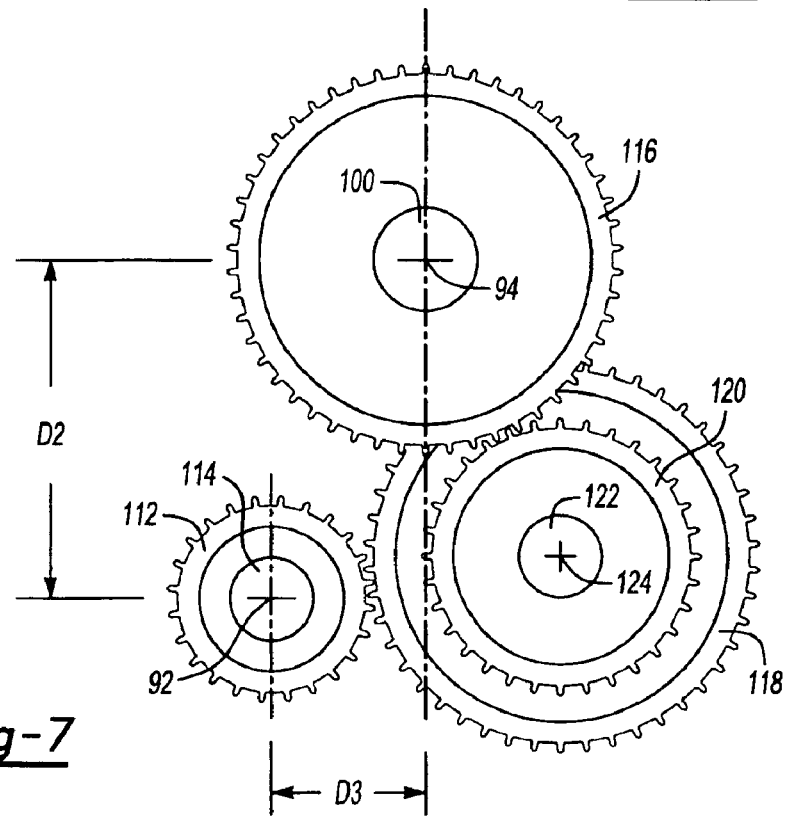
FIG. 7 is a schematic diagram of a shaft and gear layout for a gear assembly from the wheel end assembly of FIG. 6.

In the embodiment shown in FIGS. 6 and 7, the first reduction gear 118 preferably has a greater diameter than the second reduction gear 120. It should be understood that the gear diameters for the input gear 112, first reduction gear 118, second reduction gear 120, and output gear 116 can vary as is known in the art depending upon the desired gear reduction for a specific vehicle application.

The input shaft 114 drives the input gear 112 to rotate about the input axis 92. The input gear 112 is in meshing engagement with the first reduction gear 118 which is fixed to the intermediate shaft 122, resulting in the rotation of the intermediate shaft 122 about the intermediate axis 124. As the intermediate shaft 122 rotates, the second reduction gear 120 is caused to rotate. The second reduction gear 120 is in meshing engagement with the output gear 116, which drives the output shaft 100.

The input axis 92, the intermediate axis 124, and the output axis 94 are parallel to each other and extend in a direction laterally across the vehicle. The input axis 92 is positioned closest to the ground 88 with the intermediate axis 124 being vertically higher than the input axis 92 relative to the ground 88 and with the output axis 94 being vertically higher than the intermediate axis 124 relative to the ground 88. This configuration allows the drop D2 to be at least 180 mm with an option to go up to 230 mm, which allows the vehicle floor 86 to be moved significantly lower to the ground 88.

As shown in FIG. 7, the output axis 94 is positioned between the input 92 and intermediate 124 axes along a longitudinal direction. In other words, the input axis 92 is positioned to one side of the output axis 92 and the intermediate axis 124 is positioned on an opposite side of the output axis 94 from the input axis 92. This configuration provides the benefit of a longitudinal offset D3 between the output shaft 100 and the input shaft 114. This longitudinal offset D3 allows the center of the differential and input pinion (not shown) to be moved further away from the transmission, which provides room for a longer driveshaft or allows a shorter rear overhang on the vehicle 82.

The output wheel shaft 100 includes a flanged portion 126 at an outboard end and a splined portion at an inboard end. The output gear 116 is mounted via a spline attachment to the output shaft 100. The wheel hub 102 is directly mounted to the flanged portion 126. A brake component 128 is fixed to an outboard external face of the wheel hub 102 for rotation with the hub 102. The brake component 128 is preferably a disc brake assembly with a caliper 130 and a disc or rotor 132 that is mounted for rotation with the wheel hub 102. The gear housing 98 includes bosses 136 to attach to the caliper 130.

A first bearing 140 is mounted between the gear housing 98 and the output gear 116 on an inboard side of the output gear 116. A second bearing 142 is mounted between the gear housing 98 and the output gear 116 on an outboard side of the output gear 116. The bearings 140, 142 provide rotation support for the output gear 116 for driving the output shaft 100. The support tube 108 provides the bearing support for wheel bearings 110. The first reduction gear 118 and the input gear 112 are mounted outboard of the output gear bearings 140, 142 and inboard from the wheel bearings 110. Bearings 110, 140, 142 are preferably tapered roller bearings, however, other similar bearing members known in the art could also be used.

The subject invention provides a double reduction gear set 96 with the gears disposed in an outboard position close to the brake disc 132. This configuration maintains traditional aisle widths but provides the benefit of a lower floor 86. As described above, this configuration is accomplished by positioning the first reduction gear 118 outboard of the second reduction 120 and output 116 gears and as close as possible to the brake disc 132. The second reduction gear 120 and output gear 116 are mounted inboard to allow the outboard bearing 142 to be moved to closer to the inboard bearing 140 to provide room for the caliper 130 attachment to the bosses 136 on the gear housing 98.

The subject invention provides an improved wheel end assembly for an inverted portal axle that provides double reduction in addition to providing capability to move a mass transit vehicle floor close to the ground. Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A gear set for driving a vehicle wheel comprising:
    an input gear operably coupled to an input shaft for rotation about an input axis;
    a first reduction gear supported on an intermediate shaft and driven by said input gear about an intermediate axis;
    a second reduction gear operably coupled to said first reduction gear;
    an output gear coupled to an output shaft for driving a vehicle wheel, said output gear driven by said second reduction gear about an output axis wherein said input gear, said first and second reduction gears, and said output gear are mounted within a common gear housing;
    a wheel hub for supporting the vehicle wheel, said output shaft including a flanged portion at an output end, said wheel hub being mounted to said flanged portion; and
    a brake assembly having a rotating brake component mounted for rotation with said wheel hub and a non-rotating brake component mounted to said gear housing.

2. The gear set as set forth in claim 1 wherein said input axis, said intermediate axis, and said output axis are parallel to each other.

3. The gear set as set forth in claim 1 wherein said input and output axes are spaced at least 150 mm apart from each other.

4. The gear set as set forth in claim 1 wherein said input gear and said first reduction gear are positioned outboard from said second reduction gear and said output gear.

5. The gear set as set forth in claim 1 wherein said second reduction gear is concentric with said first reduction gear.

6. The gear set as set forth in claim 5 wherein said second reduction gear is supported by said intermediate shaft for rotation about said intermediate axis.

7. The gear set as set forth in claim 6 wherein said first and second reduction gears are fixed for rotation with said intermediate shaft and wherein said input gear is in meshing engagement with said first reduction gear to rotate said intermediate shaft and said second reduction gear, said second reduction gear being in meshing engagement with said output gear.

8. The gear set as set forth in claim 1 wherein said wheel hub is supported for rotation about said output axis by at least one bearing.

9. The gear set as set forth in claim 1 wherein an outboard end of said input shaft, said intermediate shaft, and an inboard end of said output shaft are substantially enclosed within said common gear housing.

10. A gear set for driving a vehicle wheel comprising:
    an input gear operably coupled to an input shaft for rotation about an input axis;
    a first reduction gear supported on an intermediate shaft and driven by said input gear about an intermediate axis;

a second reduction gear operably coupled to said first reduction gear; and an output gear coupled to an output shaft for driving a vehicle wheel, said output gear driven by said second reduction gear about an output axis wherein said input axis is positioned at a first vertical distance from ground level, said intermediate axis is positioned at a second vertical distance from ground level, and said output axis is positioned at a third vertical distance from ground level with said second vertical distance being greater than said first vertical distance and said third vertical distance being greater than said second vertical distance.

11. A vehicle wheel end assembly comprising:

an input shaft rotatable about an input axis;

a gear assembly operably coupled to said input shaft and mounted within a gear housing, said gear assembly including an input gear operably coupled to said input shaft, a reduction gear set driven by said input gear, and an output gear driven by said reduction gear set;

an output shaft driven by said output gear about an output axis;

said reduction gear set including a first reduction gear in meshing engagement with said input gear and a second reduction gear in meshing engagement with said output gear wherein said reduction gear set rotates about an intermediate axis positioned between and parallel to said input and output axes and wherein said first and second reduction gears are mounted on an intermediate shaft for rotation about said intermediate axis with said first reduction gear being mounted on an outboard end of said intermediate shaft and said second reduction gear being mounted on an inboard end of said intermediate shaft; and a wheel hub operably coupled to said output shaft for driving a vehicle wheel about said output axis, wherein said input sear is positioned outboard from said output gear at a position between said wheel hub and said output gear and wherein said input axis is positioned at a first vertical distance from ground level, said intermediate axis is positioned at a second vertical distance from ground level, and said output axis is positioned at a third vertical distance from ground level, with said second vertical distance being greater than said first vertical distance and said third vertical distance being greater than said second vertical distance.

12. The vehicle wheel end assembly as set forth in claim 11 wherein said input and output axes are spaced apart from each other by at least 180 mm.

13. The vehicle wheel end assembly as set forth in claim 11 wherein said first reduction gear has a greater diameter than said second reduction gear.

14. A vehicle wheel end assembly comprising:

an input shaft rotatable about an input axis;

a gear assembly operably coupled to said input shaft and mounted within a gear housing, said gear assembly including an input gear operably coupled to said input shaft, a reduction gear set driven by said input gear, and an output gear driven by said reduction gear set;

an output shaft driven by said output gear about an output axis;

said reduction gear set including a first reduclion gear in meshing engagement with said input gear and a second reduction gear in meshing engagement with said output gear, wherein said reduction gear set rotates about an intermediate axis positioned between and parallel to said input and output axes and wherein said first and second reduction gears are mounted on an intermediate shaft for rotation about said intermediate axis with said first reduction gear being mounted on an outboard end of said intermediate shaft and said second reduction gear being mounted on an inboard end of said intermediate shaft;

a wheel hub operably coupled to said output shaft for driving a vehicle wheel about said output axis wherein said input gear is positioned outboard from said output gear at a position between said wheel hub and said output gear; and a first bearing set mounted directly between said gear housing and said output gear and a second bearing set mounted directly between said wheel hub and a bearing support mounted to said gear housing.

15. The vehicle wheel end assembly as set forth in claim 14 wherein said input gear and said first reduction gear are positioned between said first and second bearing sets.

16. A gear set for driving vehicle wheels comprising:

first and second wheel end assemblies interconnected by an axle housing;

an input positioned closer to said first wheel end assembly than said second wheel end assembly;

a first gear assembly mounted within a first gear housing for driving said first wheel end assembly; and a second gear assembly mounted within a second gear housing for driving said second wheel end assembly, said first and second gear assemblies being driven by said input and wherein each of said first and second gear assemblies includes an input shaft rotatable about an input axis, an input gear operably coupled to said input shaft, a reduction gear set driven by said input gear about an intermediate axis positioned parallel to said input axis, an output gear driven by said reduction gear set, and an output shaft driven by said output gear about an output axis, said output shaft being operably coupled to drive a wheel hub about said output axis wherein said input gear is positioned outboard from said output gear at a position between said wheel hub and said output gear.

17. The gear set as set forth in claim 16 wherein said output axis is vertically higher than said input and intermediate axes.

18. The gear set as set forth in claim 16 wherein each of said first and second wheel end assemblies includes a rotating brake component mounted for rotation with said wheel hub and a non-rotating brake component supported by each of said first and second gear housings.

* * * * *

UNITED STATES PATENT AND TRADEMARK OFFICE
CERTIFICATE OF CORRECTION

PATENT NO.    : 6,886,655 B2
DATED         : May 3, 2005
INVENTOR(S)   : Varela et al.

It is certified that error appears in the above-identified patent and that said Letters Patent is hereby corrected as shown below:

Title page,
Item [75], Inventors, the residence for inventor "Fabio Maineri", should read as -- Milano (IT) --.

Column 7,
Line 38, "sear" should read as -- gear --.

Signed and Sealed this

Nineteenth Day of July, 2005

JON W. DUDAS
*Director of the United States Patent and Trademark Office*